Oct. 12, 1926.
E. L. WHITE
CASTER
Filed Jan. 17, 1925
1,602,631
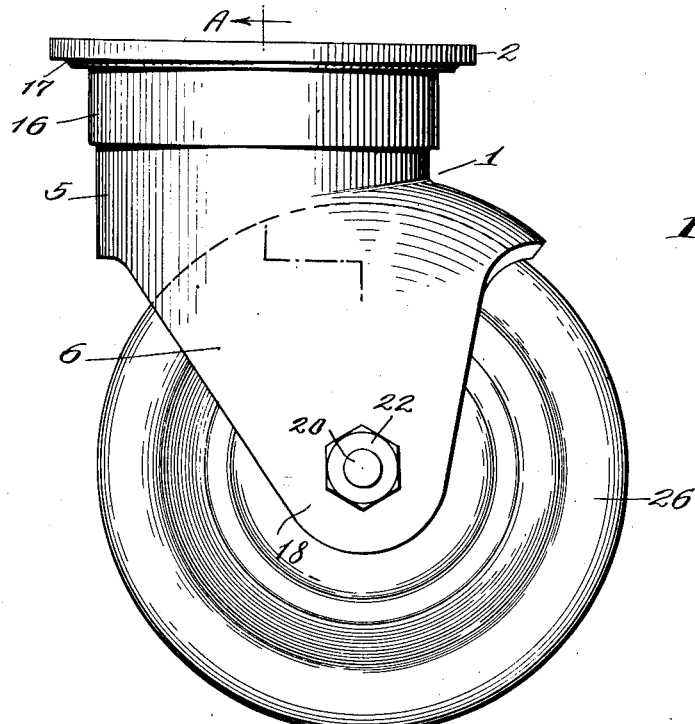
Fig.1,
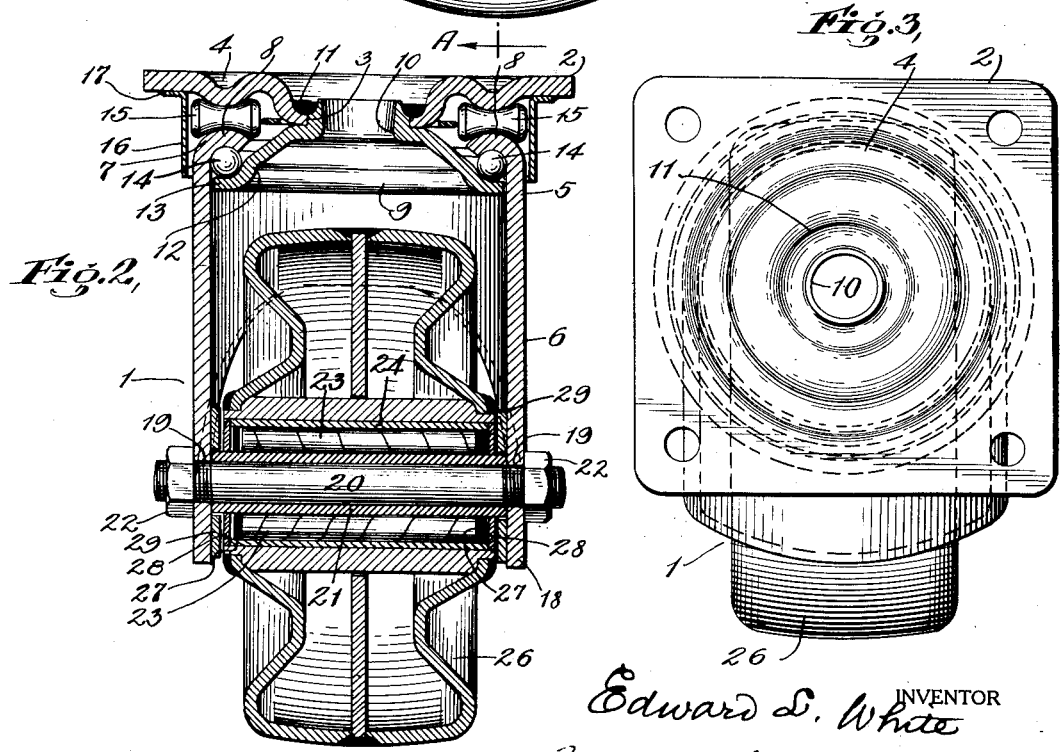
Fig.2,
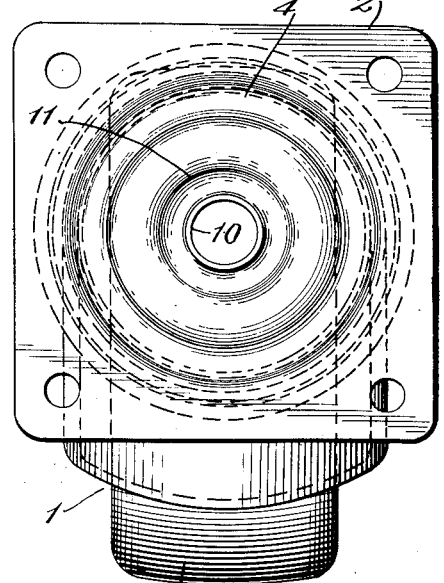
Fig.3,
Edward L. White INVENTOR
BY Henry M. Bingham ATTORNEY Patented Oct. 12, 1926.

1,602,631

UNITED STATES PATENT OFFICE.

EDWARD L. WHITE, OF TENAFLY, NEW JERSEY.

CASTER.

Application filed January 17, 1925. Serial No. 3,005.

My invention relates to improvements in casters and the objects of my improvements are to provide a strong, light, durable caster which can be cheaply and easily manufactured and can be subjected to severe shocks and strains without injury.

The other objects of my invention will be more fully set forth in the following specification:

In the accompanying drawings Figure 1 is a side elevation of my caster.

Figure 2 is a section on the line AA of Figure 1.

Figure 3 is a plan view.

Similar numerals designate similar parts throughout the respective views.

The casters heretofore in use and designed for carrying heavy loads have usually been made of cast metal parts and consisted of a top plate or load carrying member, a wheel carrying member, and a retaining plate secured by a king bolt to the top plate with ball bearings between the retaining plate and wheel carrying member and between the wheel carrying member and the top plates. Such structures where the casters were attached to the trucks or other devices were frequently subjected to heavy strains and shocks because of the uneven surface over which the caster was moved. Such strains sometimes fractured the top plate around the head of the king bolt or sheared the up set end of the king bolt and allowed the members to fall apart. Usually the continued wear caused the parts to become loose and in time produced sufficient play to permit the balls to fall out. Generally casters of this construction did not possess sufficient strength or durability to render them suitable for the purposes for which they were used. Such casters were also heavy and expensive to manufacture. My improved caster is constructed of stamped metal without bolts, rivets or other parts which are liable to be fractured or destroyed by the severe strains and shocks to which they must be subjected.

As shown in the accompanying drawings, my caster 1 is provided with a top plate 2 stamped from a sheet of metal, by which it may be attached to a truck or other load bearing device. The central portion of the top plate is depressed, as shown in Figure 2, and a central aperture 3 is formed therein, as is also a depressed rib 4. This rib 4, as shown, is concentric to the aperture 3.

The upper portion 5 of the wheel bearing member 6 is cylindrical in form and is provided with an inwardly turned lip 7. An upwardly convex rib 8 is formed on said lip. A conical retaining member 9 is formed with a neck 10 which is inserted in the central aperture 3 in the top plate and secured to it by welding, as shown at 11. The conical retaining member 9 is also formed with a shoulder 12 and a lip 13 which shoulder and lip with the concave surface of the rib 8 in the lip 9 serve as a race for the bearing balls 14 which take up the side thrusts to which the caster is subjected. Between the upper face of the rib 8 and the lower face of the rib 4 are mounted spool like concave rollers 15, the ribs being so formed as to retain the rollers 15 in position on their races and permit the wheel carrying member to turn freely about the load bearing member.

In order to protect the bearings from dust and dirt, I provide a ring 16 which is welded at 17 to the top plate 2. Depending from the cylindrical portion of the wheel carrying member 6 are ears 18 which are bored at 19 to receive the axle shaft 20 on which is mounted a sleeve 21 which serves to brace and space the ends of the ears from each other when the nuts 22 on the ends of the axle shaft 20 are seated against the outer surface of the ears. Rollers 23 are mounted around the sleeve 21 and within a sleeve 24 which is tightly fitted in the hub 25 of the wheel 26. Washers 27 of leather or other suitable material for retaining lubricants in the bearings are mounted on the sleeve 21 and within the sleeve 24. Washers 28 are mounted on the sleeve 21 and are of a diameter to fit accurately the bore of the hub 25. Washers 29 are also mounted on each end of the sleeve 21, these washers being of a greater diameter than the diameter of the sleeve 24.

Having described my invention, I claim:—

1. A caster comprising in combination a top plate of sheet metal, a depressed rib stamped therein, a sheet metal wheel carrying member having an inwardly turned lip, an upwardly convex rib formed in said lip, spool like bearing rolls mounted between said ribs, a retaining member secured to said top plate, and rotatable bearing members mounted between said retaining member and said lip on said wheel bearing member.

2. A caster comprising in combination a top plate of sheet metal having a depressed central portion, a central aperture, a depressed rib concentric to said central aperture, a sheet metal wheel carrying member having an inwardly turned lip, an upwardly convex rib formed in said lip, spool like bearing rolls mounted between said ribs, a frusto conical retaining member having a neck projecting into the central aperture of said load bearing member and welded thereto and rotatable bearing members between said retaining member and said lip on said wheel carrying member.

Jan. 16, 1925.

EDWARD L. WHITE.